United States Patent
Shanks, II et al.

(10) Patent No.: US 10,145,493 B2
(45) Date of Patent: Dec. 4, 2018

(54) SLIP-ON CONNECTOR TO GRIP AND SEAL ON SMOOTH OD PIPE/CASING AND METHOD OF USE

(71) Applicant: Oceaneering International, Inc., Houston, TX (US)

(72) Inventors: Forrest Earl Shanks, II, Rosharon, TX (US); William David Wightman, Houston, TX (US)

(73) Assignee: Oceaneering International, Inc., Houston, TX (US)

( * ) Notice: Subject to any disclaimer, the term of this patent is extended or adjusted under 35 U.S.C. 154(b) by 592 days.

(21) Appl. No.: 14/463,595

(22) Filed: Aug. 19, 2014

(65) Prior Publication Data

US 2015/0048611 A1     Feb. 19, 2015

Related U.S. Application Data

(60) Provisional application No. 61/867,281, filed on Aug. 19, 2013.

(51) Int. Cl.
| | |
|---|---|
| *F16L 35/00* | (2006.01) |
| *F16L 1/26* | (2006.01) |
| *E21B 17/02* | (2006.01) |
| *F16L 23/024* | (2006.01) |

(52) U.S. Cl.
CPC ............... *F16L 1/26* (2013.01); *E21B 17/02* (2013.01); *F16L 23/024* (2013.01)

(58) Field of Classification Search
CPC ....... F16L 37/092; F16L 37/62; F16L 37/002; F16L 37/0925

USPC ............................................ 285/18, 33, 920
See application file for complete search history.

(56) References Cited

U.S. PATENT DOCUMENTS

| | | | | |
|---|---|---|---|---|
| 3,598,429 A | | 6/1971 | Arnold | |
| 3,645,563 A | * | 2/1972 | Rochelle | ................. F16L 23/02 285/24 |
| 3,695,633 A | | 10/1972 | Hanes | |
| 3,695,634 A | * | 10/1972 | White, Jr. | ............... F16L 27/12 285/288.1 |
| 3,704,033 A | | 11/1972 | Arnold | |
| 3,711,123 A | * | 1/1973 | Arnold | .................. E21B 43/013 285/123.6 |
| 3,713,204 A | | 1/1973 | Arnold | |
| 3,713,675 A | * | 1/1973 | White, Jr. | ............. F16L 19/086 285/18 |
| 3,784,234 A | | 1/1974 | Mohr | |
| 3,842,612 A | * | 10/1974 | Arnold | .................... F16L 1/166 138/89 |
| 3,874,706 A | | 4/1975 | Arnold | |

(Continued)

*Primary Examiner* — Aaron M Dunwoody
(74) *Attorney, Agent, or Firm* — Maze IP Law, P.C.

(57) ABSTRACT

In general, a connector designed to slip on a tubular, or an extension thereof, may be locked onto the tubular and a seal created around the tubular to keep pressure trapped inside the tubular. Generally, the connector is slipped over and makes contact with the tubular via a sliding sleeve seal cover. In certain embodiments, when sufficient force is placed on the connector, one or more shear pins, which are holding the sleeve, are sheared, allowing the connector to be lowered onto the tubular and the seal to make contact with the tubular. The connector may be locked onto the tubular by means of a one piece slip energized by a cam typically held in place mechanically by one or more ratchets.

15 Claims, 4 Drawing Sheets

(56) References Cited

U.S. PATENT DOCUMENTS

| | | | | |
|---|---|---|---|---|
| 3,977,702 A | | 8/1976 | White, Jr. et al. | |
| 3,986,728 A | * | 10/1976 | Marsh ................... | F16L 37/002 285/18 |
| 4,006,921 A | | 2/1977 | Mohr | |
| 4,078,832 A | * | 3/1978 | Wittman ............... | F16L 37/002 277/621 |
| 4,728,125 A | * | 3/1988 | Reneau ................. | F16L 37/002 285/104 |
| 5,158,326 A | * | 10/1992 | Anderson ........... | E21B 33/0422 285/123.9 |
| 5,456,501 A | * | 10/1995 | Reaux ................... | F16L 37/002 285/101 |

* cited by examiner

SLIP-ON CONNECTOR TO GRIP AND SEAL ON SMOOTH OD PIPE/CASING AND METHOD OF USE

RELATIONSHIP TO PRIOR APPLICATIONS

The invention claims priority through U.S. Provisional 61/867,281 filed Aug. 19, 2013.

FIELD OF THE INVENTION

This invention comprises a connector useful for subsea pipelines. More specifically, the invention comprises a connector suitable for use over a tubular such as a pipe or casing which has a smooth outer diameter.

BACKGROUND OF THE INVENTION

Current connectors may not be able to handle required pressure ratings, e.g the pressure ratings may be low compared to certain requirements. Further, current slip and cam actuation design may allow high external loads to change the preload, e.g. increase those loads. Because of the high pressure and related pressure end loads producing tension in the connector, the preload for such connectors has to be carefully controlled as the slips will be set on the tubular close to the maximum allowable stress.

BRIEF DESCRIPTION OF THE DRAWINGS

The figures supplied herein disclose various embodiments of the claimed invention.

BRIEF DESCRIPTION OF INVENTION

Figure 1:
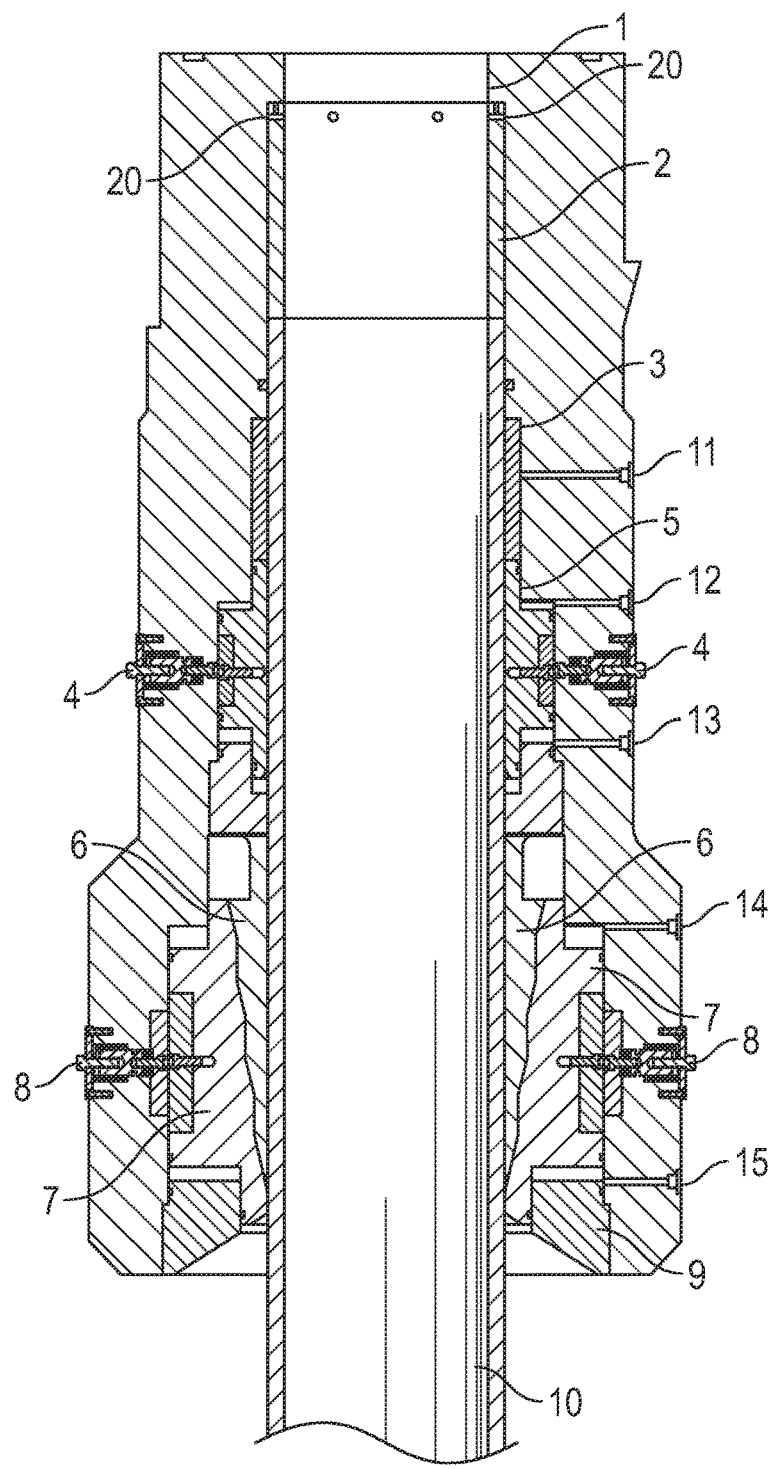
FIG. 1 is a cross-sectional view of an exemplary connector.
Figure 2:
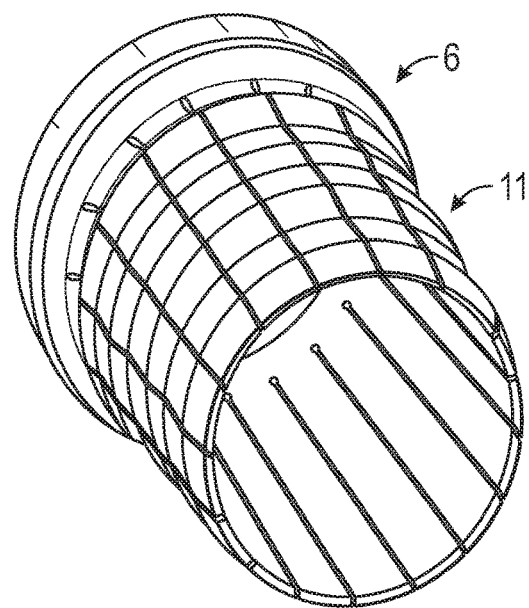
FIG. 2 is a view in partial perspective of a slip comprising a tapered, stepped face.

Referring generally to FIG. 1, in general, connector 100 is designed to slip on a pipe or casing tubular 10 or an extension thereof, allow connector 100 to be locked onto tubular 10, and create a seal around tubular 10 to keep pressure trapped inside tubular 10. Generally, when connector 100 is slipped over tubular 10, tubular 10 makes contact with seal sleeve 2 which may be a sliding seal cover. In certain embodiments, when sufficient force is placed on connector 10, one or more shear pins 20 which are holding seal sleeve 2 are sheared, allowing connector 100 to be lowered onto tubular 10 and allowing seal assembly 3 to make contact with tubular 10.

As described below, connector 100 may be locked onto tubular 10 by means of a one piece tubular gripping slip 6 which may be energized by slip cam set piston 7, which may be hydraulically activated. Slip cam set piston 7 is typically held in place mechanically by slip cam and piston ratchet retract assembly 8. Seal assembly 3 is typically disposed above tubular gripping slip 6 to prevent wellbore fluids from entering into the area around tubular gripping slip 6 and typically operated hydraulically. Seal set piston 5 is typically a hydraulic piston mechanically held in place by one or more seal piston ratchet retract assemblies 4. Tubular gripping slip 6 and slip cam set piston 7 typically have a tapered, stepped face 6a disposed between tubular gripping slip 6 and slip cam set piston 7 to produce the cam action and to allow for specific contact areas between tubular gripping slip 6 and slip cam set piston 7 which can help even out the load produced by the cam action along the length of tubular gripping slip 6 and slip cam set piston 7.

Referring still to FIG. 1, slip-on connector 100 is typically configured to slip onto and grip and seal a smooth outer portion of a tubular such as tubular 10. As will be apparent to those of ordinary skill in these arts, when actuated, connector 100 will structurally attach to, and seal against, a pipe, casing, or other tubular such as tubular 10 and be capable of withstanding pipeline axial, bending, pressure end loads, and torsion loads while maintaining full line pressure integrity. In embodiments, as discussed below, connector 100 may use two or more independent pistons for setting and releasing of pipe slip and seal assembly 8. End connection 9 can be designed to accommodate API or other end connections.

In an embodiment, slip-on connector 100 comprises substantially tubular body 1; seal sleeve 2, which is typically substantially tubular and configured to be disposed about a first end of substantially tubular body 1; slip cam and piston ratchet retract assembly 8 configured to be disposed about the substantially tubular body 1; seal assembly 3 configured to be disposed about body 1 proximate to seal sleeve 2 intermediate seal sleeve 2 and the slip cam and piston ratchet retract assembly 8; and seal piston ratchet retract assembly 4 configured to be disposed about body 1 proximate to seal sleeve 2 intermediate seal sleeve 2 and slip cam and piston ratchet retract assembly 8.

Slip cam and piston ratchet retract assembly 8 typically comprises tubular gripping slip 6 configured to be disposed about the substantially tubular body 1; one or more slip set piston vent ports 14; one or more slip cam set pistons 7, each configured to engage tubular gripping slip 6 and make tubular gripping slip 6 substantially conform to an outer surface of substantially tubular body 1; and end cap 9.

Seal assembly 3 typically comprises first seal test port 11 and is typically disposed above tubular gripping slip 6 such as to prevent wellbore fluids from entering into the slip area. In some embodiments, seal assembly 3 is configured to be hydraulically operated.

Seal piston ratchet retract assembly 4 generally comprises seal set piston vent port 12 and seal set piston actuation port 13. In addition, each seal set piston 5 may be hydraulic and configured to be mechanically held in place by a complementary set of seal piston ratchet retract assemblies 4. In embodiments, seal piston ratchet retract assembly 4 further comprises a manual override seal piston ratchet retractor 14a (FIG. 3) which may further comprise a retraction seal piston O-ring 14b (FIG. 4).

Seal sleeve 2 typically also comprises one or more shear pins 20 which are configured to hold seal sleeve 2 and, when sheared, allow connector 100 to be lowered onto tubular 10, further allowing seal assembly 3 to make contact with tubular 10.

Tubular gripping slip 6 may comprise a one piece tubular gripping slip 6 configured to be energized by one or more slip cam set pistons 7 which may be configured to be hydraulically activated and mechanically held in place by piston ratchet retract assembly 8. In some embodiments, one or both of tubular gripping slip 6 and slip cam set piston 7 further comprise a set of complimentary tapered faces 6a, which may be stepped, useful to produce the required cam action and to allow for specific contact areas between slip cam set piston 7 and tubular gripping slip 6 to help even out the load produced by the cam action along the length of slip cam set piston 7 and tubular gripping slip 6.

Further, tool functions may be reversible such as via use of hydraulics via a remotely operated vehicle (ROV) actuation panel or provide back-up mechanical means at connector main body 1. If present, an ROV interface may incorporate a single hot stab to pressurize a manifold in the ROV actuation panel which may comprise a manifold configured to feed ROV control valves as required, allowing an ROV operator to manipulate the functions of seal piston actuation/vent, seal piston retraction/vent, seal ratchet retraction/vent, slip piston actuation/vent, slip piston retraction/vent, and slip ratchet retraction/vent. Accordingly, in embodiments as discussed below slip-on connector 100 may be a hydraulically-set mechanical connector designed to provide a structural connection point subsea for pipeline and riser repairs. Connector 100 is generally scalable to pressures as high as 20,000 psi or at least to the rated pressure of tubular 10 to which connector 100 is being attached.

In an embodiment, seal piston ratchet retract assembly 4 comprises a plurality of seal position ratchets 4a and slip cam and piston ratchet retract assembly 8 comprises a plurality of piston ratchet retract ratchets 8a. Typically, when seal piston ratchets 4a are retracted and slip set sleeve ports 14 are vented, connector 100 will release from tubular 10. Slip set sleeve piston actuation port 15 may be pressurized to reposition set slip cam set piston 7 if required.

In an embodiment, one or more seal piston ratchets 4a and slip piston locking ratchets may be held in place by redundant spring action and load angle bias. In certain embodiments, secondary release may be made available for piston ratchet retract assembly 8 such as by using multiple external bolt head rotation.

Figure 3:
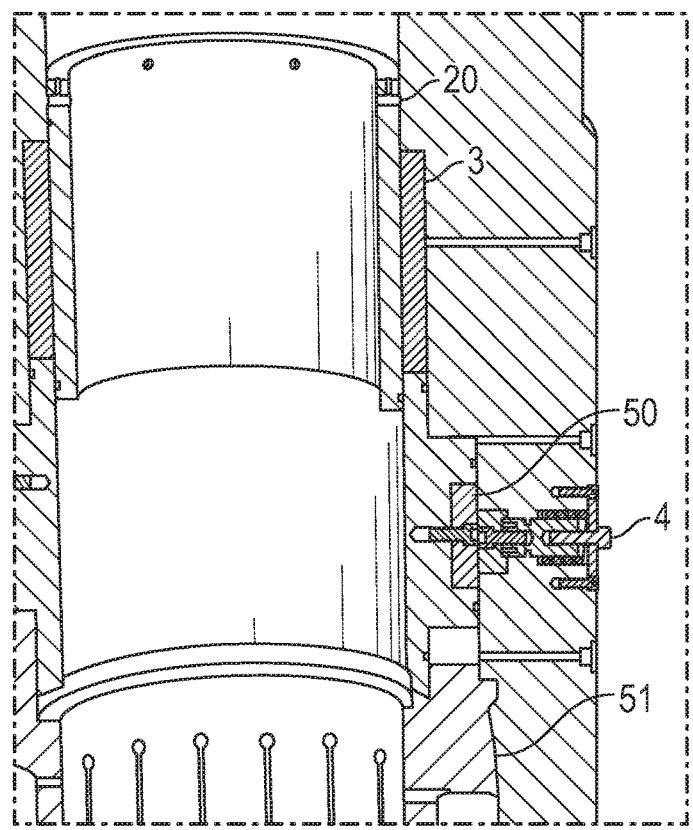
FIG. 3 is a view in partial perspective of an exemplary connector illustrating a set of seal, piston, ratchet design and slip attachment points.
Figure 4:
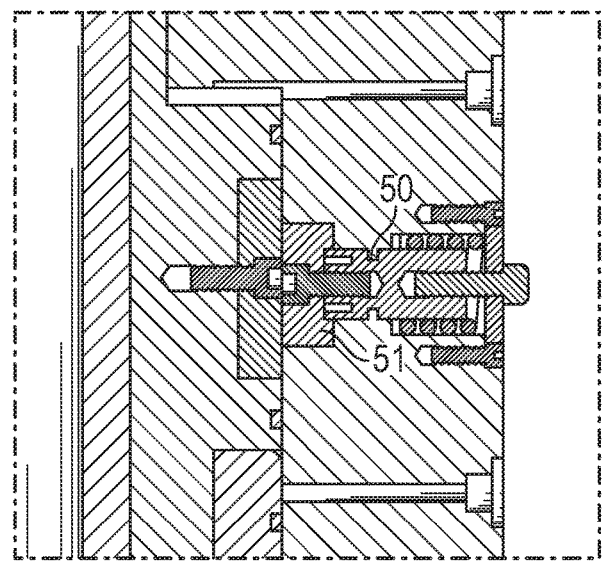
FIG. 4 is a cross-sectional view in partial perspective of an exemplary seal, piston and ratchet.
Figure 5A:
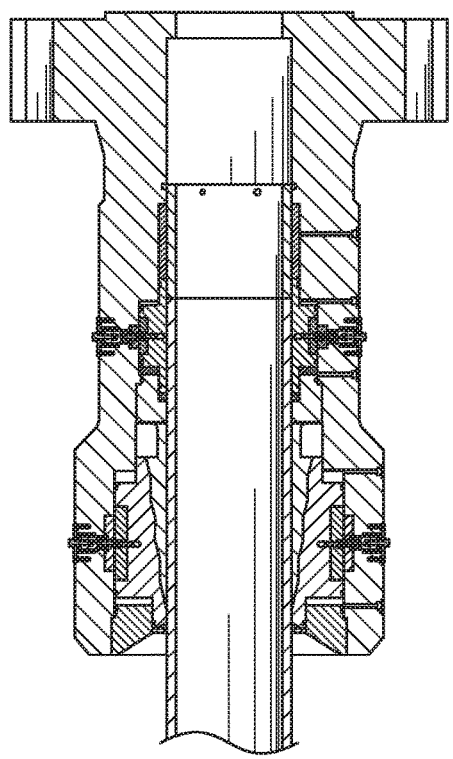
FIGS. 5a and 5b are cross sectional views in partial perspective illustrating seal protective sleeve operation.
Figure 5B:
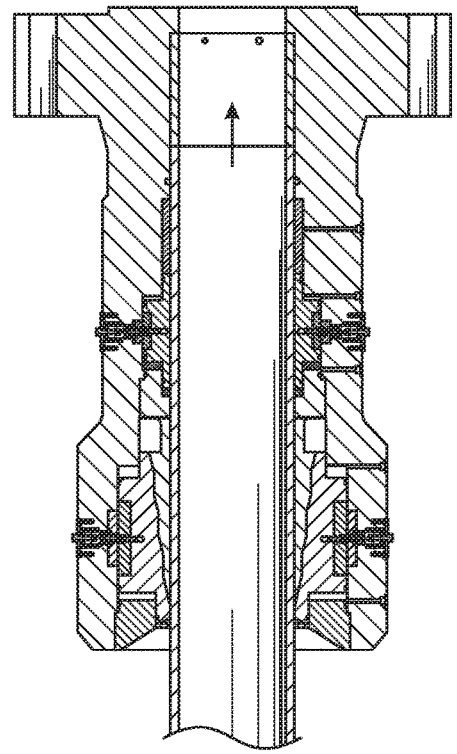

Referring now to FIG. 3, tubular gripping slip 6 may be fixed to body 1 and configured to be activated by slip cam and piston ratchet retract assembly 8 and slip cam set piston 7 to take full design load. Moreover, tubular gripping slip 6 may be further configured to release from tubular 10 when cam and slip cam set piston 7 is retracted.

Figure 6:
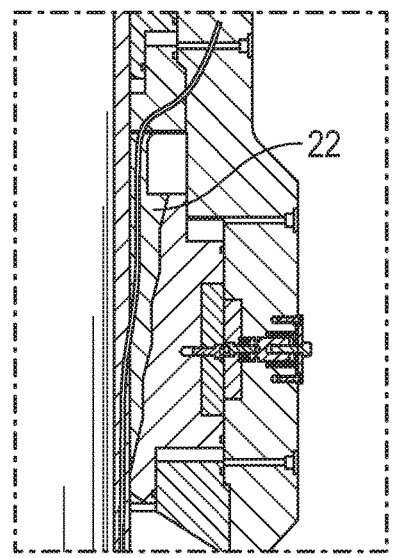
FIG. 6 is a schematic illustration of a connector load path.
Figure 7:
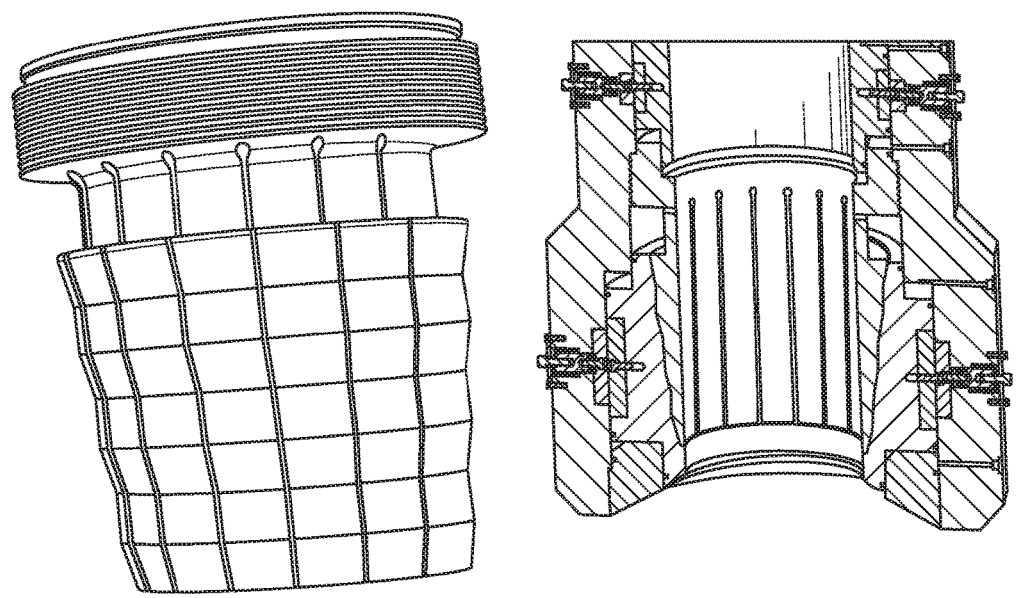
FIG. 7 is a set of views in partial perspective illustrating a slip and cam piston and ratchet embodiment.

Referring now to FIG. 6, load path 22, as illustrated in FIG. 6, allows tubular gripping slips 6 to be anchored to tubular 10 and take pressure end loads, external tension, bending loads, and torsion loads and transfer the loads into body 1 of connector 100 because tubular gripping slip 6 is typically attached directly to body 1. Using these embodiments, pressure end loads and other loads typically will not affect the preload slip cam set piston 7 or change preload when reacting to all loads.

In the operation of exemplary embodiments, connector 100 may be attached structurally to, and seal against, a pipe, casing, or other tubular such as tubular 10 by locating a subsea structure, e.g. a blowout preventer or other stack, comprising tubular 10; positioning connector 100 over tubular 10; lowering connector 100 down onto tubular 10; setting tubular gripping slip 6; and setting seal. Additionally, seal and tubular gripping slip 6 may be de-energized.

In embodiments using an ROV, setting tubular gripping slip 6 may comprise slacking off 40 to 50 Kip to shear protective seal sleeve 2 and/or shear pins 22; landing connector 100 and verifying full engagement position such as by a visual inspection of casing position markings; verifying panel functions are isolated and seal set piston actuation port 13 and slip set piston actuation port valve 15 are closed; engaging hot stab; pressurizing an ROV panel such as by opening an isolation valve regulated to 5000 psi; verifying that slip set piston vent port 14 is open; verifying that seal ratchet retract port is open; energizing slip set piston actuation port 15 to a predetermined pressure, e.g. 5000 psi; verifying that slip piston motion is at a predetermined, e.g., minimum, set such as via through inspection of one or more visual indicators; venting slip actuation pressure; verifying slip set by applying a predetermined pressure, e.g. 40 to 50 Kip over-pull, to connector 100; and slacking-off over-pull.

Setting the seal typically comprises verifying seal set piston vent port 12 is open; verifying seal ratchet retract port is open; energizing seal set piston actuation port 13 to a predetermined pressure, e.g. 5000 psi; verifying that motion of seal set piston 5 is at a desired measure, e.g. to a minimum set, such as by inspection of one or more visual indicators; venting seal actuation piston set pressure; pressurizing seal test port 11 to a predetermined pressure, e.g. 5000 psi; monitoring the pressure; and venting seal test port 11 followed by locking in test port valve.

De-energizing seal typically comprises verifying that seal set piston vent port 12 is open; verifying that seal ratchet retract ports are open; energizing seal set piston actuation port 13 to a predetermined pressure, e.g. 5000 psi; energizing ratchet retraction port to a predetermined pressure, e.g. 5000 psi; verifying retraction of ratchet such as by visual inspection of seal ratchet retract assembly bolt position indicators, which may require a fly-around connector; venting seal set piston actuation port 13; pressurizing seal set piston vent port 12 to a predetermined pressure, e.g. 5000 psi; verifying minimum travel of seal set piston 5 such as by inspection of one or more external visual indicators to running position; and venting seal set piston vent port 12 and seal ratchet retraction port.

De-energizing slip typically comprises verifying that slip set piston vent port 14 is open; verifying that slip ratchet retract ports are open; pressurizing slip set piston actuation port 15 a predetermined pressure, e.g. 5000 psi; pressurizing slip ratchet retract port a predetermined pressure, e.g. 5000 psi; verifying retraction of ratchet such as by visual inspection of one or more slip ratchet retract assembly bolt position indicators, which may require a fly-around connector; venting slip set piston actuation port 15; pressurizing seal set piston vent port 12 to a predetermined pressure, e.g. 5000 psi; verifying minimum travel of slip cam set piston 7 to running position such as by visual inspection of one or more external indicators; and venting slip set piston vent port 14 and slip ratchet retract port.

The foregoing disclosure and description of the inventions are illustrative and explanatory. Various changes in the size, shape, and materials, as well as in the details of the illustrative construction and/or a illustrative method may be made without departing from the spirit of the invention.

What is claimed is:

1. A slip-on connector to grip and seal on smooth a tubular outer casing, comprising:
    a) a substantially tubular body sized to accept the tubular outer casing;
    b) a substantially tubular seal sleeve configured to be disposed about a first end of the substantially tubular body;

c) a slip cam and piston ratchet retract assembly configured to be disposed about the substantially tubular body, the slip cam and piston ratchet retract assembly comprising:
  i) a tubular gripping slip configured to be disposed about the substantially tubular body;
  ii) a slip set piston vent port;
  iii) a slip cam set piston configured to engage the tubular gripping slip and make the tubular gripping slip substantially conform to an outer surface of the substantially tubular body; and
  iv) an end cap;
d) a seal assembly configured to be disposed about the body proximate to the seal sleeve intermediate the seal sleeve and the slip cam and piston ratchet retract assembly, the seal assembly comprising a first seal test port; and
e) a seal piston ratchet retract assembly configured to be disposed about the body proximate to the sleeve intermediate the sleeve and the slip cam and piston ratchet retract assembly, comprising:
  i) a seal set piston vent port; and
  ii) a seal set piston actuation port.

2. The slip-on connector of claim 1, wherein the connector is configured to slip onto the tubular outer casing.

3. The slip-on connector of claim 1, wherein the sleeve further comprises a shear pin configured to holding the sleeve and, when sheared, allow the connector to be lowered on the tubular, further allowing the seal to make contact with the tubular.

4. The slip-on connector of claim 1, wherein the tubular gripping slip comprises a one piece slip configured to be energized by the slip cam set piston.

5. The slip-on connector of claim 1, wherein the slip cam set piston is configured to be hydraulically activated and mechanically held in place by piston ratchet retract assembly.

6. The slip-on connector of claim 1, wherein the seal is disposed above the slip with respect to a wellbore to prevent wellbore fluids from entering into the slip area.

7. The slip-on connector of claim 1, wherein the seal is configured to be hydraulically operated.

8. The slip-on connector of claim 1, wherein the hydraulic piston is configured to be mechanically held in place by ratchets.

9. The slip-on connector of claim 1, wherein the tubular gripping slip and slip cam set piston further comprise a set of complimentary tapered stepped faces between them to produce the cam action and to allow for specific contact areas between the cam and slip to help even out the load produced by the cam action along the cam and slip length.

10. The slip-on connector of claim 1, wherein the connector comprises a hydraulically-set mechanical connector.

11. The slip-on connector of claim 1, wherein deal piston and slip piston locking ratchets are configured to be held in place by redundant spring action and load angle bias.

12. The slip-on connector of claim 1, wherein:
  a) the seal piston ratchet retract assembly comprises a plurality of seal position ratchets; and
  b) the slip cam and piston ratchet retract assembly comprises a plurality of slip cam and piston ratchet retracts.

13. The slip-on connector of claim 1, wherein:
  a) the slip is fixed to the body;
  b) the slip is configured to be activated by the cam and piston to take full design load; and
  c) the slip is further configured to release from the tubular when the cam and piston is retracted.

14. The slip-on connector of claim 1, wherein the seal piston ratchet retract assembly further comprises a manual override seal piston ratchet retractor.

15. The slip-on connector of claim 14, wherein the manual override seal piston ratchet retractor further comprises a retraction seal piston O-ring.

* * * * *